Figure 4:
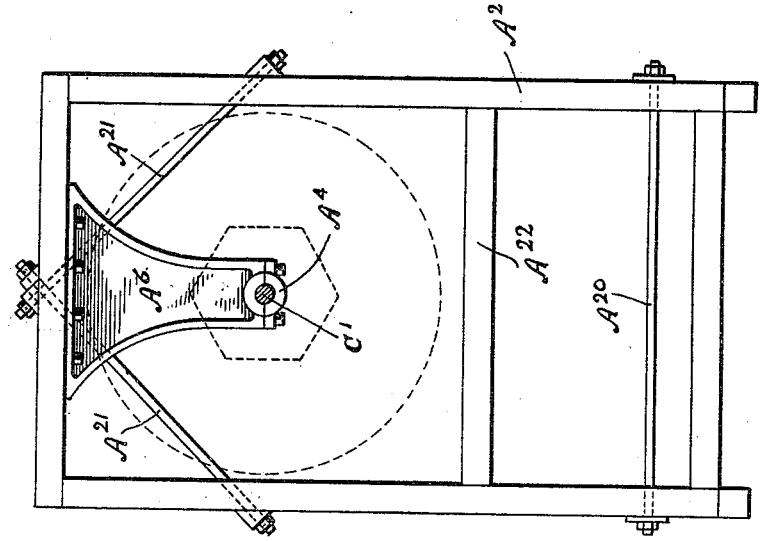

R. P. SCOTT.
GREEN PEA VINE HULLING MACHINE.
APPLICATION FILED FEB. 1, 1910.
957,443.
Patented May 10, 1910.
3 SHEETS—SHEET 1.
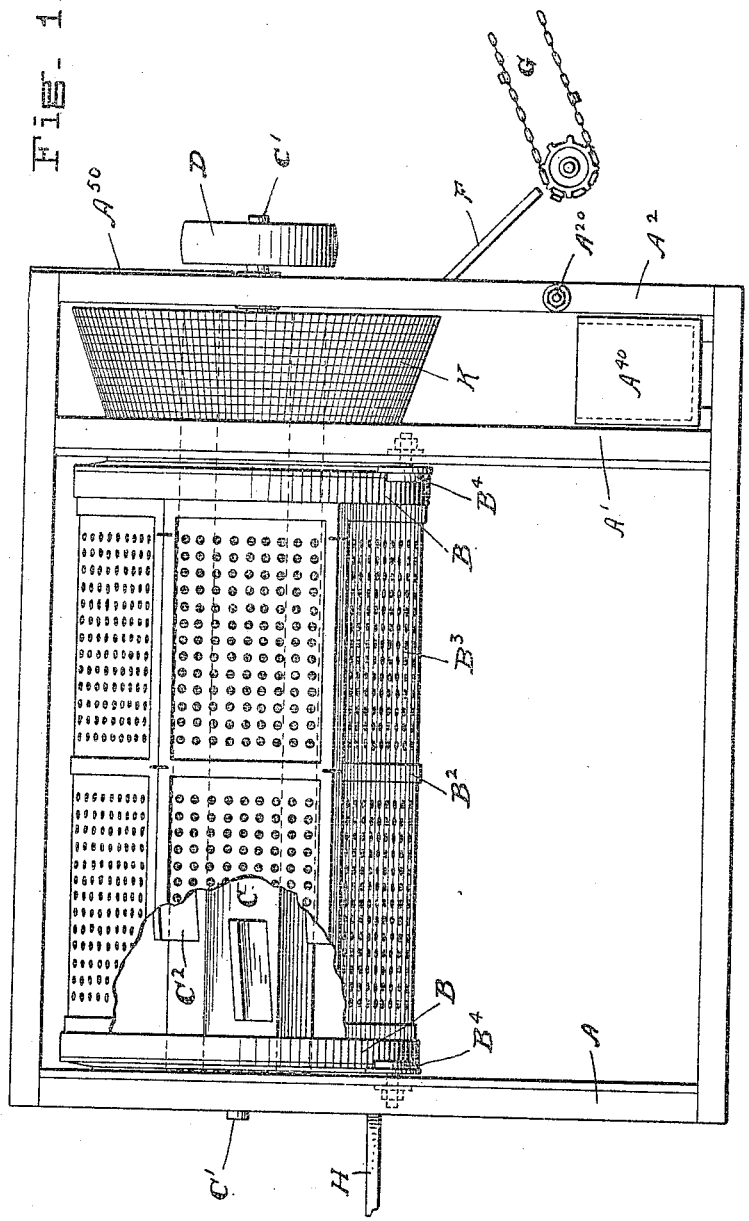
WITNESSES:
INVENTOR
Robert P. Scott.
BY
ATTORNEYS.

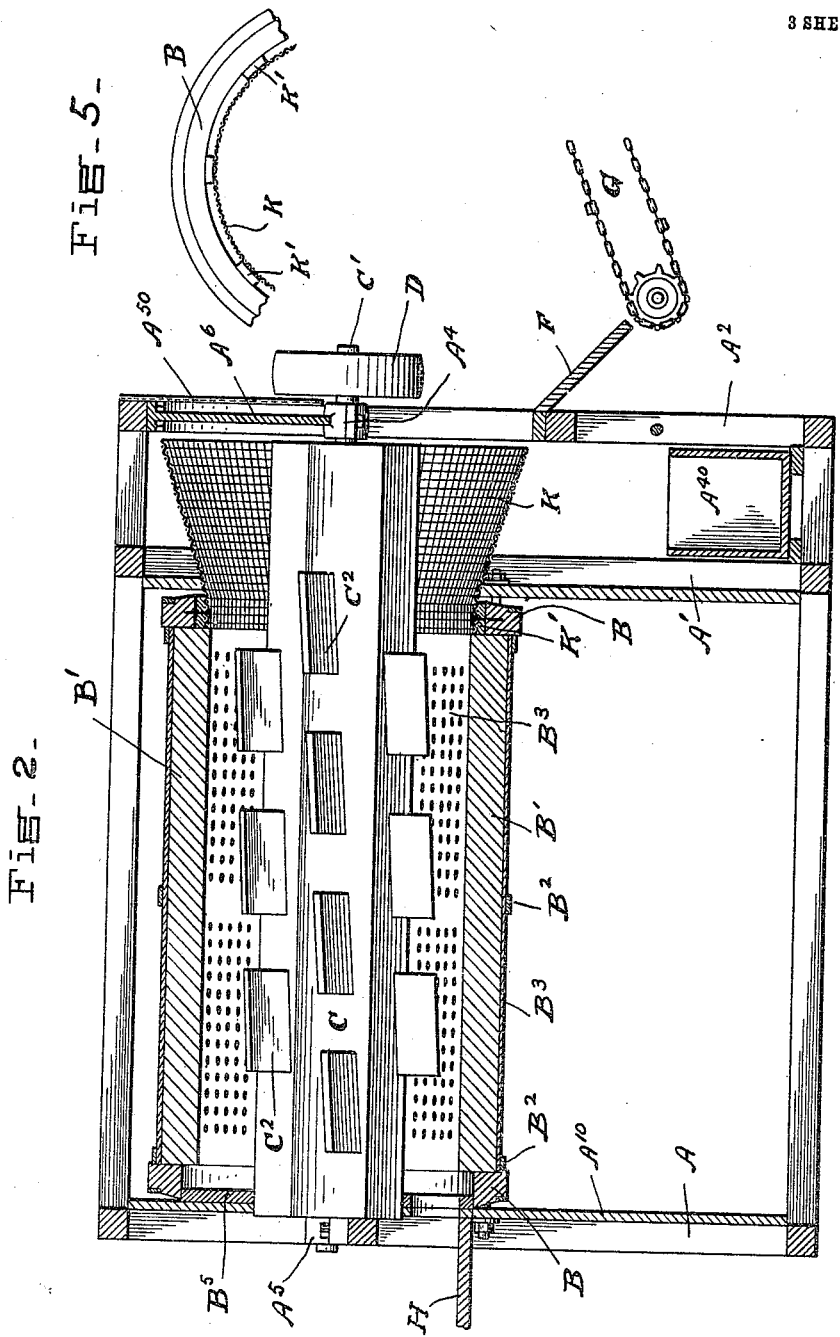

R. P. SCOTT.
GREEN PEA VINE HULLING MACHINE.
APPLICATION FILED FEB. 1, 1910.

957,443.

Patented May 10, 1910.

3 SHEETS—SHEET 3.

WITNESSES:

INVENTOR
Robert P. Scott.
BY
ATTORNEYS.

UNITED STATES PATENT OFFICE.

ROBERT P. SCOTT, OF CADIZ, OHIO.

GREEN-PEA-VINE-HULLING MACHINE.

957,443.

Specification of Letters Patent.

Patented May 10, 1910.

Application filed February 1, 1910. Serial No. 541,361.

*To all whom it may concern:*

Be it known that I, ROBERT P. SCOTT, a citizen of the United States, residing at Cadiz, in the county of Harrison and State of Ohio, have invented a new and useful Improvement in Green-Pea-Vine-Hulling Machines, of which the following is a specification.

My invention relates to an improvement in that class of machines shown in Patent No. 500,299, of June 27, 1893, to Scott, Chisholm and Chisholm, by which green peas are hulled while still attached to the vines. In the operation of this machine, masses of green pea-vines with the pea-pods attached are removed from the fields and are fed to the machine. There is an outer open-ended cylinder, provided with a perforated cover and elevating ribs, which repeatedly acts to raise a given mass of vines and then to let it drop. There is an inner revolving drum carrying slanted beaters which strike the masses of vines and the pea-pods therein while falling, thus hulling the peas. The pea berries at once escape from the outer cylinder by passing through the perforations in its cover. The path of the vines through the machine is a helix around the beater-carrying drum, the same mass of vines being repeatedly struck by the beaters while passing along this helix. There is also an extension on the inner drum which forms an end extending beyond the outer cylinder. It is necessary, on the one hand, to have the beater velocity high enough so that their impact will crack open all the pea-pods before these are discharged. On the other hand, this beater velocity may not exceed a certain amount without damaging the tender pea-berries. The shock of the impact is applied not merely to pods on the surface of the masses of vines but is also transmitted through the vines to hull the pods embedded therein. A beater-speed high enough to hull a pod embedded in a mass of vines may damage the berries in a pod which is struck while on the surface of the mass. It happens, as a consequence, that the lowest beater velocity which will hull all the peas in their transit through the machine, which is necessarily of a limited length, and the highest permissible velocity which will not damage any substantial proportion of the berries are quite close together. Furthermore it transpires that if any considerable portion of the hulling is done near the discharge-end of the outer cylinder, the beaters, because of their slant, will project a number of hulled pea-berries through its open end, so that the pea-berries become mixed with the threshed out vines and are lost.

It is the object of my invention to avoid this difficulty and this loss of hulled pea-berries in the machine as now constructed so that the operator may choose his beater-speeds sufficiently low so as to hull the pea-pods throughout the length of the outer cylinder, instead, as in the previous practice, of being compelled to choose his beater-speeds so high as to cause his hulling to be finished before the end of the outer cylinder was reached, thus sacrificing a portion of the effective length of the machine and risking the damage of green peas by unnecessarily high beater-speeds. I accomplish this result by securing to the end of the outer cylinder a conical extension screen which surrounds the extended end of the beater-carrying drum. This screen acts to catch the hulled berries projected through the end of the outer cylinder by the beaters and to sift out these berries, as well as any others which may remain in the straw, before this is passed onto the straw-carrier.

Figure 3:
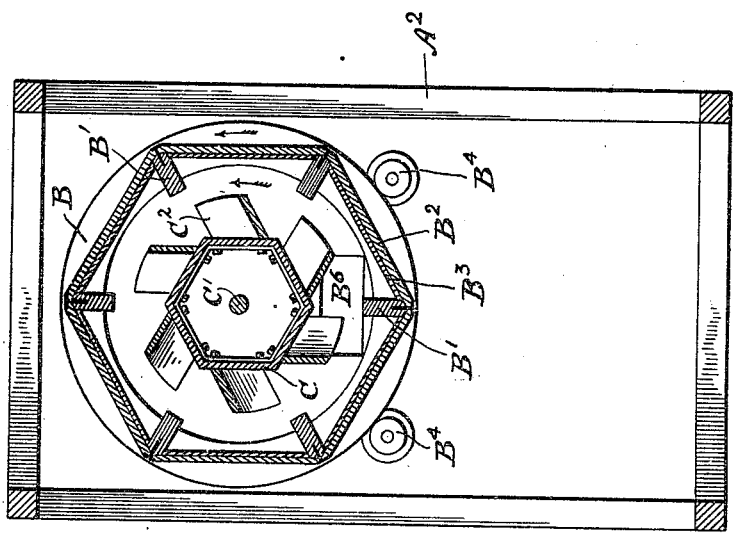

In the drawings:—Figure 1 is a side elevation of my machine; Fig. 2 is a longitudinal, central section; Fig. 3 is a vertical, transverse section; Fig. 4 is a view of the end-frame; and Fig. 5 is a detail of the method of fastening the screen.

I employ a frame composed of the sections A, A' and A². The outer cylinder is composed of the ring B connected by the elevating ribs B' and covered by perforated rubber B³ secured to frames B², which are in turn fastened to the elevating ribs and end rings. This outer cylinder, composed of the end rings, the elevating ribs and the perforated covering, is supported on travelers B⁴, secured respectively to the frames A and and A', and is rotated at say 30 turns a minute by any suitable mechanism not necessary here to be shown. At the feed-end, the outer cylinder is closed by a circular face-plate B⁵ having a feed aperture B⁶, the face-plate being attached to a supporting frame-plate A¹⁰. At the discharge end, the outer cylinder is quite open so that there may be no obstruction to the discharge of the vines.

The beater-carrying drum C is mounted on a shaft C', supported in a bearing A⁵, on the frame A, and in a bearing A⁴, carried on a hanger A⁶, attached to the frame A². The beater-carrying drum is, as shown, a hexagonal prism carrying rows of beaters C² on its several faces. A canvas cover A⁵⁰ is attached to the upper part of the frame A² to prevent hulled pea-berries from being hurled therethrough. There is a box A⁴⁰ to receive the hulled berries which have been sifted from the straw, a discharge chute F for transferring the straw onto the straw-carrier G which removes it from proximity to the machine, and the usual feed-board H juxtaposed to the feed aperture B⁶.

The end frame A² has a draw-rod A²⁰, for the purpose of imparting greater strength, as well as a cross-bar A²². This frame is also strengthened by diagonal truss-rods A²¹. This put, it remains to describe the subject of my invention. This consists of an annular extension-screen K, which is preferably conical and which is attached to the inner face of the end-ring B of the outer cylinder, being preferably separated therefrom by cleats K'. The extension-screen is generally made of a wire net fabric, having the wires say an eighth of an inch in diameter, with a mesh of about half an inch. The cleats K' constitute a space between the end-ring B and the wire mesh. These end-rings are quite broad and by means of the cleats, I increase the width of my sifting surface by an area corresponding to the width of the ring B.

It will now be clear that instead of having the straw with some hulled berries mixed up therein drop on the straw-carrier as soon as the straw gets beyond the end-ring B, as in the prior machine, this straw and the hulled berries are turned around and agitated in the conical screen, thus giving the berries which are mixed with the straw an opportunity to pass through the meshes of the screen into the box A⁴⁰. At the same time the speed of the beaters C² can be chosen so that effective hulling is done throughout the cylinder and even at the discharge-end, for despite the fact that pods are hulled at this discharge-end and some of the hulled berries are thrown against the canvas A⁵⁰ which closes the machine, these berries fall back into the screen K and are sifted out before getting on the straw-carrier, whereas heretofore such hulled berries as struck the canvas A⁵⁰ fell directly in the straw and, being unsifted, were lost in the straw pile. It is almost unnecessary to add that the conical shape of the screen assists the passage of the straw from the end-ring B to the straw-carrier F, and that the sifting effected by the screen K is merely the supplementary sifting of the machine, the main work of separating the hulled berries from the straw while the vines are passing through the machine being effected by the perforations in the covering B³ of the outer cylinder.

I claim,—

1. A green-pea vine-hulling machine comprising an outer cylinder having a perforated covering and elevating ribs, a beater-carrying drum having an extended end, and an annular extension-screen secured to the discharge end of the outer cylinder and surrounding the drum-end, substantially as described.

2. A green-pea vine-hulling machine comprising an outer cylinder having a perforated covering and elevating ribs, a beater-carrying drum having an extended end, and a conical, annular extension-screen secured to the discharge end of the outer cylinder and surrounding the drum-end, substantially as described.

3. A green-pea vine-hulling machine comprising a pair of frames supporting an outer cylinder having a perforated covering and elevating ribs, an end frame having a discharge aperture for the vines, an inner beater-carrying drum, a driving shaft therefor supported on one of the pair of frames and the end frame, and an annular extension-screen secured to the discharge end of the outer cylinder and extending to the end-frame, substantially as described.

4. A green-pea vine-hulling machine, comprising a pair of frames supporting an outer cylinder having a perforated covering and elevating ribs, an end-frame having a discharge aperture for the hulled vines and a suspended shaft hanger, an inner beater-carrying drum, a driving shaft therefor supported on one of the pair of frames and in the suspended shaft hanger, and an annular extension-screen secured to the discharge-end of the outer cylinder and extending to the discharge aperture on the end-frame, substantially as described.

In testimony whereof I have signed my name to this specification in the presence of two subscribing witnesses.

ROBERT P. SCOTT.

Witnesses:
P. B. KERR,
JNO. S. LACEY.